United States Patent
Lepley et al.

(10) Patent No.: US 6,785,531 B2
(45) Date of Patent: Aug. 31, 2004

(54) DUAL-FUNCTION REMOVABLE REVERSABLE UNIT FOR RADIO AND TELEPHONE

(75) Inventors: Geoffrey Peter Lepley, Essex (GB); Dean Anthony Miles, Kent (GB); Kevin Langley Gallichan, Herts (GB); Nicholas James Robberts, Essex (GB)

(73) Assignee: Visteon Global Technologies, Inc., Dearborn, MI (US)

( * ) Notice: Subject to any disclaimer, the term of this patent is extended or adjusted under 35 U.S.C. 154(b) by 618 days.

(21) Appl. No.: 09/815,209

(22) Filed: Mar. 22, 2001

(65) Prior Publication Data

US 2002/0137541 A1 Sep. 26, 2002

(51) Int. Cl.$^7$ ................................................. H04B 1/08
(52) U.S. Cl. ....................................................... 455/351
(58) Field of Search ............................... 455/344, 345, 455/346, 347, 348, 349, 350, 351, 550, 556, 569

(56) References Cited

U.S. PATENT DOCUMENTS

| | | |
|---|---|---|
| 5,107,244 A | 4/1992 | Minamide et al. |
| 5,202,913 A | 4/1993 | Lang et al. |
| 5,243,640 A | 9/1993 | Hadley et al. |
| 5,312,263 A | 5/1994 | Zapalski et al. |
| 5,333,177 A | 7/1994 | Braitberg et al. |
| 5,418,836 A | 5/1995 | Yazaki |
| 5,535,274 A | 7/1996 | Braitberg et al. |
| 5,537,673 A * | 7/1996 | Nagashima et al. ........ 455/346 |
| 5,798,984 A | 8/1998 | Koch |
| 5,836,496 A | 11/1998 | Levin et al. |
| 5,865,503 A | 2/1999 | Shields, Jr. |
| 5,963,872 A * | 10/1999 | Stein .......................... 455/557 |
| 5,964,601 A | 10/1999 | Tsurumaru et al. |
| 5,974,333 A * | 10/1999 | Chen ....................... 455/569.2 |
| 6,202,008 B1 * | 3/2001 | Beckert et al. ............... 701/33 |

* cited by examiner

Primary Examiner—Vivian Chin
Assistant Examiner—Sanh Phu
(74) Attorney, Agent, or Firm—Brinks Hofer Gilson & Lione

(57) ABSTRACT

The present invention provides for a modular communication system to be installed in a motor vehicle. The communication system in accordance with the teachings of the present invention includes a base unit and a removable unit. The base unit is provided with a cavity to insert the removable unit. The communication system is rendered inoperable when the removable unit is removed from the base unit. The removable unit is provided with two surfaces that perform different function. In particular when the removable unit is inserted into the base unit and the first surface is exposed then the communication system operates as a radio player. The removable unit is capable of being reversed such that second surface is exposed, then the communication system operates as a telephone unit.

39 Claims, 2 Drawing Sheets

DUAL-FUNCTION REMOVABLE REVERSABLE UNIT FOR RADIO AND TELEPHONE

TECHNICAL FIELD OF THE INVENTION

This invention generally relates to a communication unit used in a motor vehicle. More specifically, this invention relates to a device that can be used to perform the functions of both a radio and a telephone while interfacing with the main communication unit installed in a motor vehicle.

BACKGROUND OF THE INVENTION

With the technological advancements in wireless communication, increasing number of automotive vehicles are being equipped with mobile communication devices, such as cellular phones. Nearly every vehicle is equipped with an audio system; such as radio player, a cassette tape, a CD player or a combination thereof. Therefore, it is desirable to integrate the communication device and the audio system such that each system takes into account the presence of another system. For example, it would be desirable for the audio system to inhibit its production of sound while a call is in progress in the cellular phone.

As the communication devices and the audio system installed in an automotive vehicle gets more and more sophisticated and expensive, there have been increased number of anti-theft devices to prevent the theft of such expensive equipment. An area of particular focus and significance in the field of automotive anti-theft devices concerns the security and protection of car stereo system component units, which oftentimes have a radio receiver and amplifier along with a tape cassette or compact disc player combined in a single unit. Typical measures taken to discourage thieves include rendering the radio inoperable in a visible manner. This can be done by providing a radio alarm or by allowing for removal of the entire radio when the vehicle operator leaves the vehicle. Thus in addition, to increase the security of the highly sophisticated equipment installed in an automotive vehicle, it is highly desirable to integrate the communication system and the audio system in one unit to reduce the complexity and expense of the overall system. Integration of both the systems will prevent additional costs of have more than one anti-theft device installed in one automobile. Further, the audio function and telephone functions can be combined in one secure panel such that common components can be shared. Additionally, thieves can be discouraged by allowing an occupant to remove the entire radio bezel when the operator leaves the vehicle so the car radio loses its appearance and functionality as a car radio. Further, some are designed such that an operator may remove only an essential portion of a bezel to render the radio inoperable. Removing only the bezel is easier than requiring the removal of the entire radio since the overall radio tends to be heavy and bulky. Similarly, there have been a number of anti-theft devices have been developed to prevent the theft of the mobile phone as a separate unit. Such devices may include providing a protective housing for the mobile phone or locking the mobile phone in a docking unit. However, having separate anti-theft devices for the audio system and the communication device increase the overall cost of such equipment.

In addition, to increase the security of the highly sophisticated equipment installed in an automotive vehicle, it is highly desirable to integrate the communication system and the audio system in one unit to reduce the complexity and expense of the overall system. Integration of both the systems will prevent additional costs of having more man one anti-theft device installed in one automobile. Further, the audio function and telephone functions can be combined in one secure panel such that common components can be shared.

SUMMARY OF THE INVENTION

The present invention provides for a modular communication system to be installed in a motor vehicle. The communication system in accordance with the teachings of the present invention includes a base unit and a removable unit. The base unit is provided with a cavity to insert the removable unit. The communication system is rendered inoperable when the removable unit is removed from the base unit. The removable unit is provided with two surfaces that perform different function. In particular when the removable unit is inserted into the base unit and the first surface is exposed then the communication system operates as a radio player. The removable unit is capable of being reversed such that second surface is exposed, then the communication system operates as a telephone unit.

BRIEF DESCRIPTION OF THE DRAWINGS

Further features and advantages of the invention will become apparent from the following discussion and accompanying drawings, in which.

DETAILED DESCRIPTION OF THE INVENTION

The following description of the preferred embodiment is merely exemplary in nature, and is in no way intended to limit the invention or its application or uses.

Figure 1:
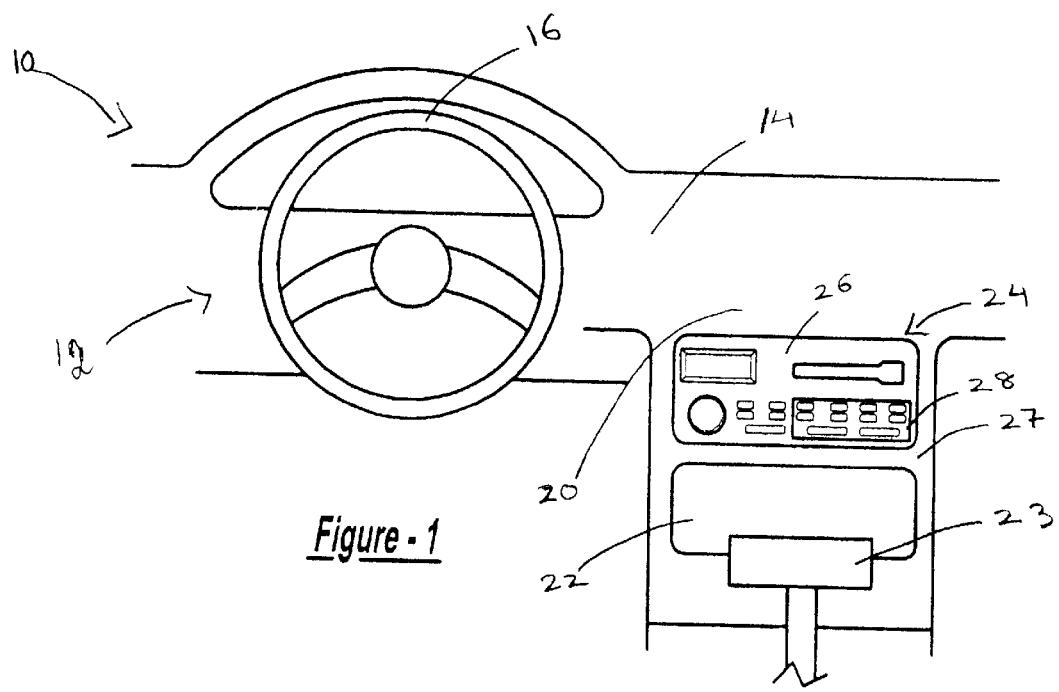
FIG. 1 is a perspective representation of the motor vehicle incorporating the reversible unit according to the first preferred embodiment of the invention.

A representative motor vehicle incorporating the features of the present invention is shown in FIG. 1 and typically designated by referenced number 10. The motor vehicle 10 defines an interior compartment 12 and an instrument panel 14. The instrument panel 14 is generally installed in the vicinity of a windshield (not shown) in the motor vehicle 10. The instrument panel 14 which functions to incorporate a number of controls easily accessible to an occupant of a motor vehicle typically comprises a steering wheel system 16 installed in the driver side, a glove compartment (not shown) installed in the passenger side of the motor vehicle 10 and a central console 20.

The central console 20 typically includes a plurality of controls easily accessible to an occupant of a motor vehicle 10 to adjust a number of user options provided in any motor vehicle. Typically such controls include an HVAC System 22, a display unit 23 associated with the HVAC system for displaying the temperature of the interior of the motor vehicle and/or the temperature outside the motor vehicle, the intensity or the speed of the blower unit and other features such as time and the distance traveled by the motor vehicle 10. The central console 20 also includes a communication system 24. The central console may or may not include all of the above features. Typically, the central console 20 is an integral part of the instrument panel 14 although it is possible to make the central console 20 modular and separate from the instrument panel 14.

The communication system 24 typically comprises a base unit 26 and a removable unit 28. The base unit 26 is fixedly attached to the central console 20 and is preferably nested in a cavity (not shown) provided in the central console 20. Alternatively, the base unit 26 can be an integral part of the central console 20. In the preferred embodiment the base unit 26 typically functions as a vehicle interface unit between the vehicular parts and the removable unit 28. The base unit 26 is connected to a speaker unit (not shown). Preferably, the base unit 26 is also connected to a navigation system (not shown) and an external antenna (not shown) typically present in any motor vehicle.

Figure 2:
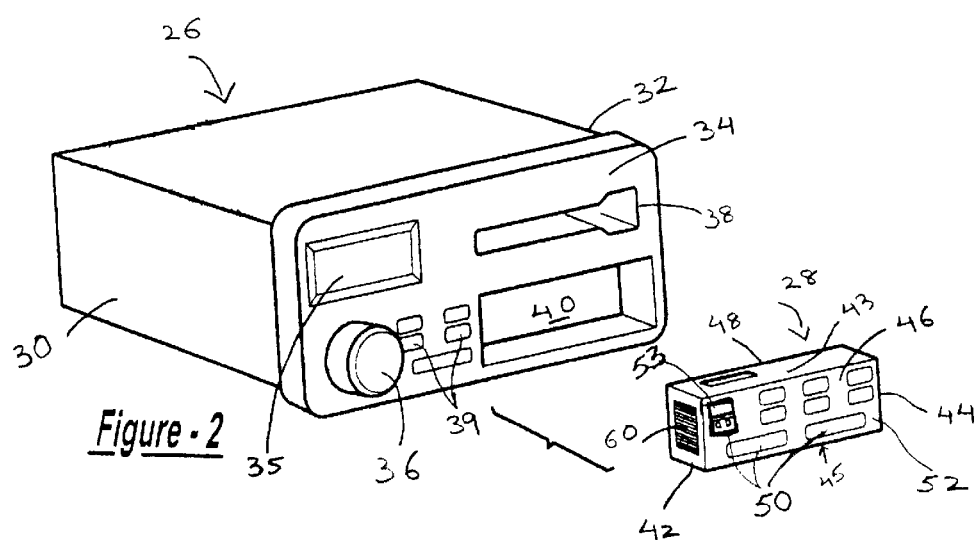
FIG. 2 is a perspective view of the reversible unit with the first surface exposed according to the preferred embodiment of the invention.

As shown in FIG. 2, typically, the base unit 26 is rectangular in shape and comprises sides 30 and 32 parallel to each other. As discussed above, the base unit 26 is inserted inside a cavity provided in the central console 20 such that the base unit 26 is horizontally inserted. Between the sides 30 and 32 the base unit 26 comprises a front panel 34. The front panel 34 typically is an integral part of the base unit 26. Alternatively is may be formed of a separate piece that is removable. As seen in FIG. 1, preferably the front panel 34 is flush with the front face 27 central console 20 of the instrument panel 14. Alternatively, it is also possible that the base unit 26 is protruding outwards towards the occupants such that the front panel 34 is not flush with the front face 27 central console 20. The preference of whether the front panel 34 of the base unit 26 is flush with the central console 20 or is protruding outside the central console 20 is a matter of aesthetics and will not affect the function or the use of the base unit 26.

As seen in FIG. 2, the front panel 34 typically has a plurality of controls associated with it. Typically, the front panel 34 has a volume control 36 for increasing or reducing the volume, an audio unit 38 and a display monitor 35. Alternatively, the font panel 34 may also have controls 39 for rewinding or fast-forwarding a tape or a CD of the audio unit 38. Preferably, the audio unit 38 includes a cassette or a CD player for inserting either a cassette or a CD to enable an occupant to listen to programs or music of the occupant's choice. The front panel 34 of the base unit 26 may or may not include all of the features or may omit some of the features listed above.

The display monitor 35 is conventional in art and displays a plurality of images, numbers or both. For example, if the CD player is operational then the display monitor 35 will let the occupant of the vehicle know what song number is being played.

As seen in FIG. 2, the front panel 34 of the base unit 26 includes a cavity or opening 40. Although in this Figure it is shown that the cavity 40 is at the bottom of the base unit 26, it must be understood that the cavity 40 can be placed anywhere in the base unit 26. Although not shown in the drawings, the inside (generally indicated by reference numeral 41) of the cavity 40 has a connector port to allow connection between the removable unit 28 and the base unit 26 (as will be explained later).

Figure 3:
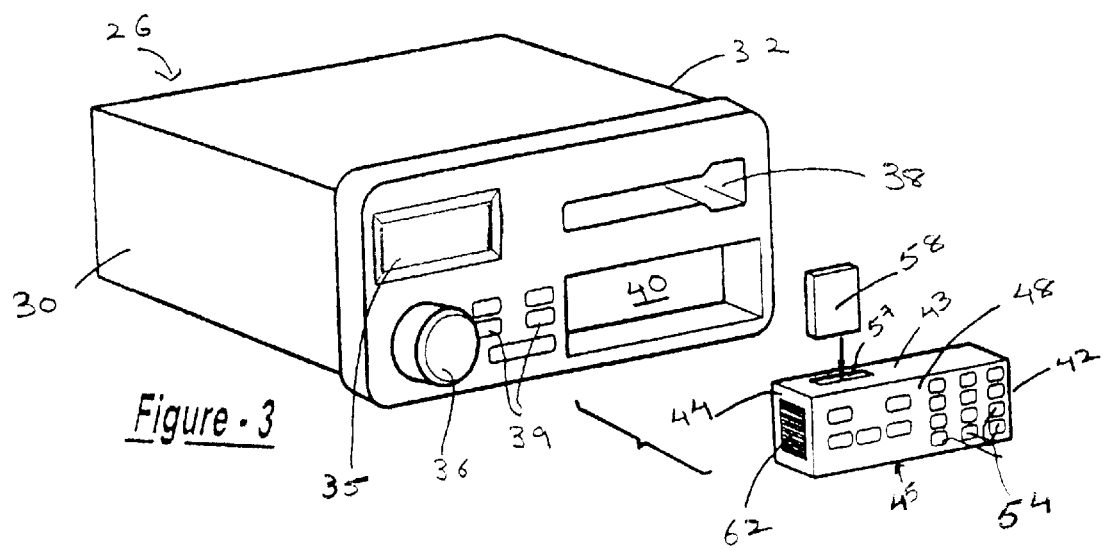
FIG. 3 is a perspective view of the reversible unit with the second surface exposed according to the preferred embodiment of the invention.

As seen in FIGS. 2 and 3, the removable unit 28 is capable of being inserted into the cavity 40 of the base unit 26. Typically, the removable unit 28 is rectangular in shape and has the dimension such that it snuggly fits into the cavity 40 provided in the base unit 26. Typically, the removable unit is inserted horizontally into the cavity of the base unit 26. In order to remove the removable unit 28 the removable unit 28 is provided with means to eject the removable unit 28 from the base unit 26. The means (not shown) to eject the removable unit 28, from the base unit 26 may be in the form of a press button, or an electronically controlled switch. Alternatively, the means to eject the removable unit 28 may be provided in the base unit 26. It is also possible that the base unit 26 or the removable unit 28 will have a snap fit configuration or a snap fit clip such that the removable unit 28 may be snap fitted into the base unit 26.

As shown in FIGS. 2 and 3, the removable unit 28 is separate form the base unit 26. When the removable unit 28 is removed from the base unit 26, it renders the base unit 26 inoperable. Alternatively, as the removable unit is removed from the base unit the communication system 24 may be rendered inoperable.

As shown in FIGS. 2 and 3, like the base unit 26, the removable unit 28 typically has two sides 42, 44 respectively, a top surface 43 and a bottom surface 45. The removable unit 28 defines a first surface 46 and a second surface 48 parallel to each other and placed between the sides 40 and 42 of the removable unit 28. In the preferred embodiment, the removable unit 28 is inserted into the cavity 40 such that the sides 42 and 44 are parallel to the sides 30 and 32 of the base unit 26. When the removable unit 28 is inserted into the cavity 40 of the base unit 26, either the first surface 46 or the second surface 48 is exposed to the occupant. The exposed surface 46 or 48 is flush with the front panel 34 of the base unit 26 such that when the base unit 26 and the removable unit 28 are fitted together they give the appearance of a single unit.

The first surface 46 of the removable unit 28 has a plurality of controls generally designated by reference number 50 that enables the first surface 46 to perform a particular function. Preferably, the plurality of controls 50 are in the form of soft key buttons. Alternatively, they may be in the form of a touch pad. The plurality of controls 50 on the first surface 46 is similar to that of a typical radio player. Therefore, when the removable unit 28 is inserted into the base unit 26 and the first surface 46 is exposed to the occupant, the communication system 14 functions as a radio player 52. Typically, the plurality of controls 50 comprises multiple programming buttons that enable the occupant to the tune and program the radio player 52. The plurality of controls may also include controls for changing the frequency of the radio player. Additionally, the plurality of controls 50 present on the first surface 46 may also include controls for turning on and off the radio player. The first surface 45 may or may not include all the features mentioned above.

In order for the first surface 46 to perform as a radio player, the plurality of controls 50 is internally connected to a first communication port 60 on side 42 of the removable unit 28. As the removable unit 28 is inserted into the cavity 40, a connection is established between the first communication port 60 and the connector port on the base unit 26. Preferably, the first communication port 60 is optically or electronically connected to the connector base on the base unit 26. As a particular control 50 is operated, the particular operation will be displayed in the display monitor 35 present on the base unit. For example, if the occupant operates the control for changing the frequency, the display monitor will display if what particular frequency is being operated.

As shown in FIG. 2 the first surface 46 preferably includes a pager unit 53. The pager unit 53 by itself is conventional in art. Typically, the pager unit is capable of receiving a text and/or alphanumeric messages. Preferably, the pager unit is integrally attached to the first surface 46. In order for the occupant to receive a page, the first surface 46, internally includes a circuit (not shown) and a pager antenna (not shown). Preferably, the pager unit 53 is electronically connected to the base unit 26 through the first communication port 60. Preferably, the pager unit 53 has its own display unit 55. Alternatively, it is possible that the pager unit 53 connects to the display monitor 35 on the base unit 26. Alternatively, the pager unit 53 is present on the second surface 48 of the removable unit 28.

As shown in FIG. 3, the second surface 48 of the removable unit 28 is substantially parallel to the first surface 46 of the removable unit 28 such that when the removable unit 28 is reversed, the second surface 48 is exposed to the occupant. The second surface 48 also comprises a plurality of controls generally designated by reference numeral 54. The plurality of controls 54 on the second surface 48 is different from the plurality of controls 50 on the first surface 46. When the second surface 48 is exposed to the occupant, it is preferred that the second surface 48 perform the function of a telephone unit 56. Therefore, the controls 54 displayed on the second surface 48 are typical to controls found in any telephone. The plurality of controls 54 may be in the form of soft key buttons (as shown) or alternatively in the form of a touch pad. The plurality of controls 54 may include a control button to send and receive controls to enable an occupant to dial the desired number and to send the number. It may include a control button to end calls, a control button to recall a number, etc. Typically, the second surface 48 may also include an angled microphone (not shown) to enable the user to talk on the telephone while operating the motor vehicle 10.

In order for the second surface 48 to function as a telephone unit 56, the plurality of controls 54 is internally connected to a second communication port 62. As the removable unit 28, is inserted into the cavity 40 with the second surface 48 exposed, a connection is established between the second communication port 62 and the connector port in the base unit 26. Preferably, the second communication port 62 is optically or electronically connected to the connector base on the base unit 26. As a particular control of plurality of control 54 is operated, the particular operation will be displayed in the display monitor 35 present on the base unit 26. For example, if the occupant dials a particular number, the display monitor 35 will display the being dialed.

In order to enhance the power and capability of the removable unit 28, the top surface 43 of the removable unit includes an opening 57 to insert a SIM Card 58 to expand the memory of the telephone unit 56 to store numbers. Alternatively, the opening 57 may be provided anywhere in the removable unit 28 to insert a SIM card or any other device capable of expanding the memory of the removable unit 28.

In the typical working of the communication system 24, the removable unit 28 is inserted into the cavity 40 provided in the base unit 26. As shown in FIG. 2, the first surface 46 is exposed to the occupant such that the communication unit 24 functions as a radio player 52. As explained above, the base unit 26 also includes a number of sensors (not shown). Therefore, when the first surface 46 is exposed to the occupant of a motor vehicle 10, a plurality of sensors are sent to the communication system 24 such that the audio unit 38 is inoperable. The removable unit 28 is also connected to the display monitor 35 present in the base unit 26 through a plurality of sensors. The display monitor 35 will display the mode or the function that the communication system 24 is performing. Therefore, when the first surface 46 is exposed to the occupant, the display monitor 35 will display that the communication unit 24 is being used as a radio player 52 and may alternatively also display the preferred radio channel that the occupant is currently hearing.

As discussed above, the first surface 46 of the removable unit 28 may also include a pager unit 53. Therefore, in addition to function as a radio player 52, the first surface 46 may also receive text/alphanumeric pages. Both the radio player 52 and the pager unit 53 can operate at the same time. Therefore, when a page arrives, the display monitor 35 will display the message. If the occupant desires to return the call, in one simple motion, can reverse the removable unit 28 such that the second surface 48 is exposed.

In the event the occupant chooses to change the function of the removable unit 28, the occupant may remove and reverse the removable unit 28 such that the second communicator port 62 is in communication with the base unit 26. In this position, the communication system 24 now functions as a telephone unit 56 that enables the occupant to make a call. As explained above, the display monitor 35 will display the number dialed by the occupant or will also display the incoming call received by the occupant. It is preferred that when the communication unit 24 functions as a telephone unit 56, the audio unit 38 cannot be used. Alternatively, it is possible that the communication system 24 performs only one function at a time. In other words, the communication system may be used only as a radio player 52 or a telephone unit 56 or an audio unit 38.

Although in the preferred embodiment, the reversible radio-telephone unit is used in a motor vehicle, it must be understood that the application of the is not limited to such uses. As seen above, the removable unit 28 allows a complete contact to be established such that one unit may be used both as a telephone unit or a radio player in one easy movement by the occupant. The above design allows for less controls to be present in the central console.

The foregoing discussion discloses and describes a preferred embodiment of the invention. One skilled in the art will readily recognize from such discussion, and from the accompanying drawings and claims, that changes and modifications can be made to the invention without departing from the true spirit and fair scope of the invention as defined in the following claims.

What is claimed is:

1. A communication system installed in a motor vehicle having an interior compartment for receiving and transmitting communication signals, the system comprising:

a vehicle interface module fixedly attached to the vehicle body, the vehicle interface module defining a cavity and a communication port; and a radio-telephone module removably inserted inside the cavity of the vehicle interface module such that the radio-telephone module connects to the vehicle interface module through the communication port wherein the radio-telephone module has at least a first surface and a second surface;

wherein the system is adapted to perform a first set of functions when the radio-telephone module is inserted inside the cavity of the vehicle interface module such that the first surface is exposed to the interior compartment;

wherein the system is adapted to perform a second set of functions when the radio-telephone module is inserted inside the cavity of the vehicle interface module such that the second surface is exposed to the interior compartment; and wherein the first set of functions is different from the second set of functions.

2. The system of claim 1 wherein the vehicle interface module further comprises an audio module adapted to perform a third set of functions, such that the third set of functions is different from the first set of functions and the second set of functions.

3. The system of claim 2 wherein the vehicle interface module further comprises a display unit to display at least the first set of functions, the second set of functions or the third set of functions.

4. The system of claim 3 wherein the display unit is internally connected to the radio-telephone module such that when the radio-telephone module is inserted into the cavity of the vehicle interface module the display unit is adapted to display the first set of functions or the second set of functions.

5. The system of claim 3 wherein the audio module includes a volume control, a cassette player or a CD player.

6. The system of claim 1 wherein the first surface of the radio-telephone module has a first means adapted to perform the first set of functions.

7. The system of claim 6 wherein the first set of functions is that of a radio player.

8. The system of claim 6 wherein the first means are electronically connected to a first connector port in the telephone radio module, such that when the first connector port connects with the communication port in the vehicle interface module, the radio-telephone module functions as a radio player.

9. The system of claim 6 wherein the first means includes at least one button capable of programming the radio player, at least one button capable of searching a radio station.

10. The system of claim 1 wherein the second surface of the radio-telephone module includes a second means adapted to perform the second set of functions.

11. The system of claim 10 wherein the second set of functions is that of a telephone unit.

12. The system of claim 10 wherein the second means are electronically connected to a second connector port in the telephone radio module, such that when the second connector port connects with the communication port in the vehicle interface module, the second surface functions as a telephone unit.

13. The system of claim 1 wherein the second means includes at least one button to send and receive telephone calls and a plurality of buttons with numeric numbers displayed to make the telephone calls.

14. The system of claim 1 wherein the communication port is electronically connected to radio-telephone module.

15. The system of claim 1 wherein the communication port is optically connected to radio-telephone module.

16. A radio-telephone module adapted to be installed in a cavity provided in a communication module of an instrument panel of a vehicle, the radio-telephone module comprising:

a first surface having a first set of controls capable of performing a first set of functions when the radio-telephone module is in a first configuration within the cavity;

a second surface having a second set of controls capable of performing a second set of functions when the radio-telephone module is in a second configuration within the cavity;

wherein the first set of functions is different from the second set of functions; and wherein the radio-telephone module adapted to be reversed such that the second surface is exposed to the cavity when the radio-telephone module is in the first configuration within the cavity, and the first surface is exposed to the cavity when the radio-telephone module is in a second configuration within the cavity.

17. The radio-telephone module of claim 16 wherein the first set of functions is that of a radio player.

18. The radio-telephone module of claim 16 wherein the second set of functions is that of a telephone unit.

19. The radio-telephone module of claim 16 wherein the first set of controls is Internally connected a first communication port in the radio-telephone module such that when the radio-telephone module is inserted into the cavity, the first surface performs the first set of functions.

20. The radio-telephone module of claim 19 wherein the first communication port is internally connected to a display unit in the communication module such that when the radio-telephone module is inserted into the cavity, the display unit is adapted to display the first set of functions.

21. The radio-telephone module of claim 16 wherein the second set of controls is internally connected a second communication port in the radiotelephone module such that when the radio-telephone module is inserted into the cavity, the second surface performs the second set of functions.

22. The radio-telephone module of claim 21 wherein the second communication port is internally connected to a display unit in the communication module such that when the radio-telephone module is inserted into the cavity, the display unit is adapted to display the second set of functions.

23. The radio-telephone module of claim 16 wherein the first set of controls includes at least one button capable of programming the first surface, at least one button capable of searching a particular frequency of radio waves.

24. The radio-telephone module of claim 16 wherein the second set of controls includes at least one button to send and receive telephone calls, a plurality of buttons with numeric numbers displayed to make the telephone calls.

25. A method of providing a modular communication system for receiving and transmitting communication signals in a motor vehicle having an interior compartment, the method comprising the steps of:

providing a vehicle interface module fixedly attached to the vehicle body, such that vehicle interface module defines a cavity and a communication port;

providing a radio-telephone module removably insertable inside the cavity of the vehicle interface module such that the radio-telephone module connects to the vehicle interface module through the communication port wherein the radio-telephone module has at least a first surface and a second surface;

inserting the radio-telephone module inside the cavity of the vehicle interface module such that the first surface is exposed to the interior compartment of the motor vehicle;

ejecting the radio-telephone module from the cavity of the vehicle interface module; and reinserting the radio-telephone module inside the cavity of the vehicle interface module such that the second surface is exposed to the interior compartment of the motor vehicle;

wherein the first surface is adapted to perform a first set of functions when the first surface is exposed to the to the interior compartment of the motor vehicle;

wherein the second surface is adapted to perform a second set of functions when the second surface is exposed to the to the interior compartment of the motor vehicle; and wherein the first set of functions is different from the second set of functions.

26. The method of claim 25 wherein the vehicle interface module further comprises an audio module adapted to perform a third set of functions, such that the third set of functions is different from the first set of functions and the second set of functions.

27. The method of claim 26 wherein the vehicle interface module further comprises a display unit to display at least the first set of functions, the second set of functions or the third set of functions.

28. The method of claim 27 wherein the display unit is internally connected to the radio-telephone module such that when the radio-telephone module is inserted into the cavity of the vehicle interface module the display unit is adapted to display the first set of functions or the second set of functions.

29. The method of claim 27 wherein the audio module includes a volume control, a cassette player or a CD player.

30. The method of claim 25 wherein the first surface of the radio-telephone module has a first means adapted to perform the first set of functions.

31. The method of claim 30 wherein the first set of functions is that of a radio player.

32. The method of claim 30 wherein the first means are electronically connected to a first connector port in the telephone radio module, such that when the first connector port connects with the communication port in the vehicle interface module, the radio-telephone module functions as a radio player.

33. The method of claim 30 wherein the first means includes at least one button capable of programming the radio player and at least one button capable of searching a radio station.

34. The method of claim 25 wherein the second surface of the radio-telephone module includes a second means adapted to perform the second set of functions.

35. The method of claim 34 wherein the second set of functions is that of a telephone unit.

36. The method of claim 34 wherein the second means are electronically connected to a second connector port in the telephone radio module, such that when the second connector port connects with the communication port in the vehicle interface module, the second surface functions as a telephone unit.

37. The method of claim 25 wherein the second means includes at least one button to send and receive telephone calls and a plurality of buttons with numeric numbers displayed to make the telephone cells.

38. The method of claim 25 wherein the communication port is electronically connected to radio-telephone module.

39. The method of claim 25 wherein the communication port is optically connected to radio-telephone module.

* * * * *

UNITED STATES PATENT AND TRADEMARK OFFICE
CERTIFICATE OF CORRECTION

PATENT NO. : 6,785,531 B2
DATED : August 31, 2004
INVENTOR(S) : Geoffrey P. Lepley et al.

It is certified that error appears in the above-identified patent and that said Letters Patent is hereby corrected as shown below:

<u>Column 8,</u>
Line 12, after "of controls is" delete "Internally" and substitute -- internally -- in its place.
Line 62, after "is exposed" delete "to the to" and substitute -- to -- in its place.

Signed and Sealed this

Fifteenth Day of February, 2005

JON W. DUDAS
*Director of the United States Patent and Trademark Office*